(12) United States Patent
Honkanen

(10) Patent No.: US 7,383,659 B1
(45) Date of Patent: Jun. 10, 2008

(54) FISHING LURE WORM WITH MOVING TAIL

(76) Inventor: Theodore Honkanen, 2156 Weller Way, Sacramento, CA (US) 95818

(*) Notice: Subject to any disclaimer, the term of this patent is extended or adjusted under 35 U.S.C. 154(b) by 0 days.

(21) Appl. No.: 11/731,902

(22) Filed: Mar. 30, 2007

(51) Int. Cl.
*A01K 85/01* (2006.01)
*A01K 85/00* (2006.01)

(52) U.S. Cl. .............. 43/26.2; 43/42.24; 43/42.28; 43/42.31

(58) Field of Classification Search .......... 43/26.1, 43/26.2, 42.31, 17.1, 42.24, 42.26, 42.28
See application file for complete search history.

(56) References Cited

U.S. PATENT DOCUMENTS

| | | | | |
|---|---|---|---|---|
| 891,037 | A * | 6/1908 | Caldwell | 43/26.2 |
| 2,611,986 | A * | 9/1952 | Silva | 43/42.28 |
| 2,724,205 | A * | 11/1955 | Howard | 43/26.2 |
| 2,909,868 | A * | 10/1959 | Lewis | 43/26.2 |
| 3,007,432 | A * | 11/1961 | Still | 43/26.1 |
| 3,045,381 | A * | 7/1962 | Martin | 43/26.2 |
| 3,065,564 | A * | 11/1962 | Dawes | 43/26.2 |
| 3,085,361 | A * | 4/1963 | Rhodes | 43/26.2 |
| 3,105,317 | A * | 10/1963 | Fox | 43/26.2 |
| 3,120,073 | A * | 2/1964 | Brunton | 43/17.1 |
| 3,310,902 | A * | 3/1967 | Godby | 43/17.1 |
| 3,416,254 | A * | 12/1968 | Bornzin | 43/17.1 |
| 3,715,830 | A * | 2/1973 | Price | 43/26.2 |
| 4,223,467 | A * | 9/1980 | Hodges et al. | 43/42.31 |
| 4,536,985 | A * | 8/1985 | Caviness | 43/26.2 |
| 4,602,451 | A * | 7/1986 | Perez et al. | 43/26.1 |
| 4,790,100 | A * | 12/1988 | Green, Sr. | 43/42.28 |
| 4,805,339 | A * | 2/1989 | Fuentes et al. | 43/42.31 |
| 4,832,650 | A * | 5/1989 | Tong | 43/26.2 |
| 4,960,437 | A * | 10/1990 | Watson et al. | 43/42.31 |
| 5,001,856 | A * | 3/1991 | Gentry | 43/42.31 |
| 5,127,183 | A * | 7/1992 | Wulff | 43/42.28 |
| 5,203,103 | A * | 4/1993 | Hawley | 43/42.24 |
| 5,237,771 | A * | 8/1993 | Watson et al. | 43/42.31 |
| 5,301,453 | A * | 4/1994 | Terrill | 43/42.24 |
| 5,485,697 | A * | 1/1996 | Watson et al. | 43/42.31 |
| 5,697,182 | A * | 12/1997 | Rodgers | 43/42.31 |
| 5,875,582 | A * | 3/1999 | Ratzlaff et al. | 43/26.1 |
| 6,047,492 | A * | 4/2000 | Watson et al. | 43/42.31 |
| 6,058,644 | A * | 5/2000 | Irwin et al. | 43/26.2 |
| 6,108,962 | A * | 8/2000 | Barron | 43/42.31 |

(Continued)

FOREIGN PATENT DOCUMENTS

FR 2720894 A1 * 12/1995

(Continued)

Primary Examiner—Darren W Ark
(74) Attorney, Agent, or Firm—Kyle Fletcher

(57) ABSTRACT

The invention is a fishing lure that resembles a worm with a vibrating and/or rotating tail that is electrically motorized. The body of the fishing lure contains a battery pack, which supplies electrical power to a motor. The bottom of the housing contains the hook that is needed to catch a fish, as well as where the tail connects to the motor. The housing has a removable cap that enables the end user to install and remove batteries. The cap also provides a watertight seal thereby preventing the introduction of water into the internal compartment so as to avoid unwanted damages to the electrical and mechanical components. The device turns on when a tilt switch, located between the battery supply and motor, is titled at a predetermined angle.

2 Claims, 3 Drawing Sheets

U.S. PATENT DOCUMENTS

| | | | |
|---|---|---|---|
| 6,581,319 B2 * | 6/2003 | West | 43/26.2 |
| 6,647,659 B1 * | 11/2003 | King et al. | 43/17.6 |
| 6,665,976 B2 * | 12/2003 | West | 43/26.2 |
| 6,675,525 B1 * | 1/2004 | Ford | 43/42.24 |
| 6,684,556 B1 * | 2/2004 | Arbuckle et al. | 43/26.2 |
| 6,804,909 B1 * | 10/2004 | West | 43/26.2 |
| 6,807,766 B1 * | 10/2004 | Hughes et al. | 43/42.31 |
| D500,832 S * | 1/2005 | Richardson et al. | D22/127 |
| 2006/0196104 A1 * | 9/2006 | Lapointe | 43/42.24 |

FOREIGN PATENT DOCUMENTS

| | | | | |
|---|---|---|---|---|
| GB | 2307837 | A | * | 6/1997 |
| GB | 2368509 | A | * | 5/2002 |
| JP | 09205939 | A | * | 8/1997 |
| JP | 11009142 | A | * | 1/1999 |
| JP | 2000125703 | A | * | 5/2000 |
| JP | 2002171883 | A | * | 6/2002 |
| JP | 2003310104 | A | * | 11/2003 |
| JP | 2005341826 | A | * | 12/2005 |
| JP | 2006230236 | A | * | 9/2006 |
| WO | WO 9921416 | A1 | * | 5/1999 |

* cited by examiner

FISHING LURE WORM WITH MOVING TAIL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of fishing lures, more specifically, fishing lure worms with vibrating and/or rotating tails.

B. Prior Art

The King et al. patent (U.S. Pat. No. 6,647,659) discloses a fishing lure powered with its own battery and motorized vibration generating embodiment. However, the device disclosed does not use a tail that is motorized, but rather a motorized vibration generator that is entirely located within the housing of the lure. Furthermore, the fishing lure resembles a small fish as opposed to a worm that has a vibrating tail.

The Hawley patent (U.S. Pat. No. 5,203,103) discloses a fishing lure that has a battery powered movement apparatus. However, the device disclosed requires a Nitinol or shape metal alloy that is wired to an externally battery pack, as opposed to a worm with the battery pack contained internally. Also, the actuating means uses a Nitinol wire as opposed to a vibrating and/or rotating motor.

The Arbuckle patent (U.S. Pat. No. 6,684,556) discloses a battery operated remotely controlled vibrating fishing lure. However, the remotely controlled vibrating fishing lure does not resemble a worm with a vibrating and/or rotating tail.

The Ratzlaff et al. patent (U.S. Pat. No. 5,875,582) discloses an artificial lure in which operates by battery power and makes it look as if it is life-like. However, the device disclosed propels itself by a water propulsion means, as opposed to a vibrating and/or rotating motor that connects to the tail.

The Wulff patent (U.S. Pat. No. 5,127,183) discloses a fishing lure fly apparatus, which does not include a battery supply, a vibrating and/or rotating motor, or a tail.

The Richardson et al. patent (U.S. Pat. No. Des. 500,832) illustrates a design for a worm lure.

BRIEF SUMMARY OF THE INVENTION

The invention is a fishing lure that resembles a worm with a vibrating and/or rotating tail that is electrically motorized. The body of the fishing lure contains a battery pack, which supplies electrical power to a motor. The bottom of the housing contains the hook that is needed to catch a fish, as well as where the tail connects to the motor. The housing has a removable cap that enables the end user to install and remove batteries. The cap also provides a watertight seal thereby preventing the introduction of water into the internal compartment so as to avoid unwanted damages to the electrical and mechanical components. The device turns on when a tilt switch, located between the battery supply and motor, is titled at a predetermined angle.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
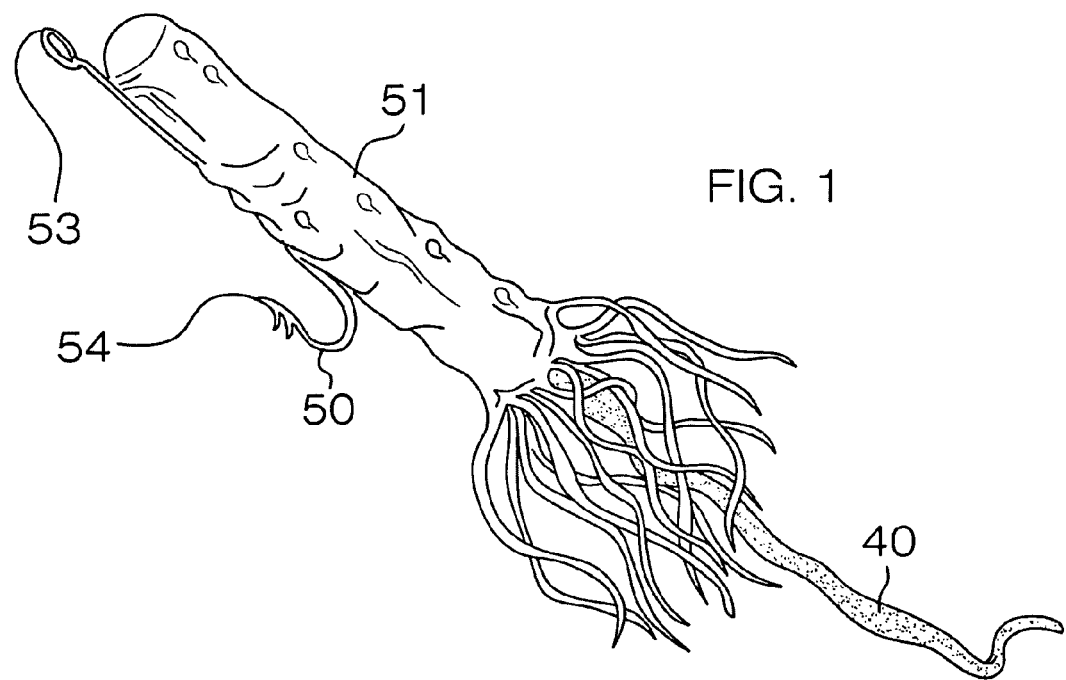
FIG. 1 illustrates the invention by itself.
Figure 2:
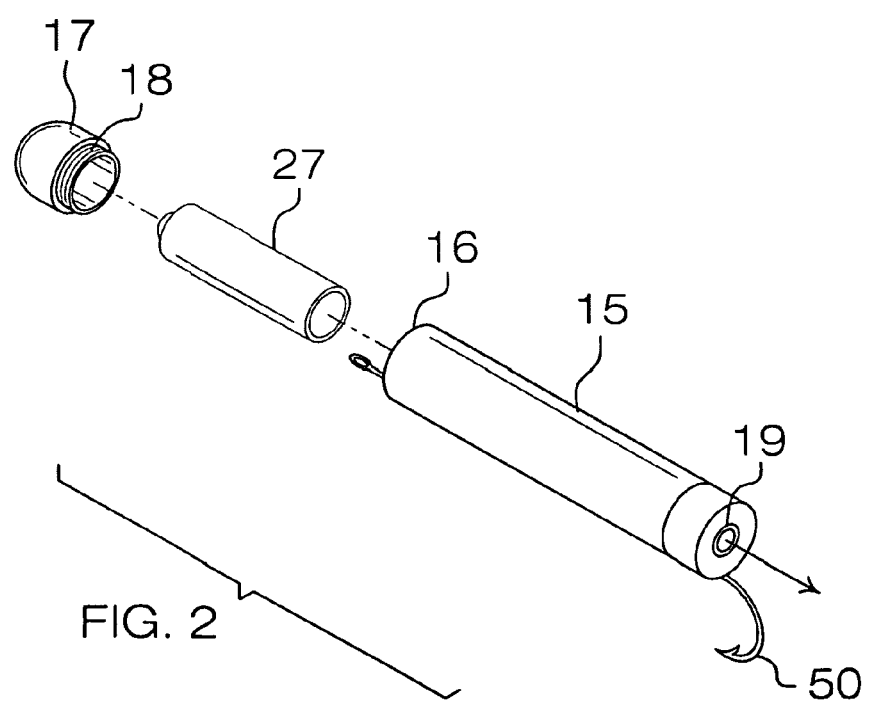
FIG. 2 illustrates the invention in an exploded view.
Figure 3:
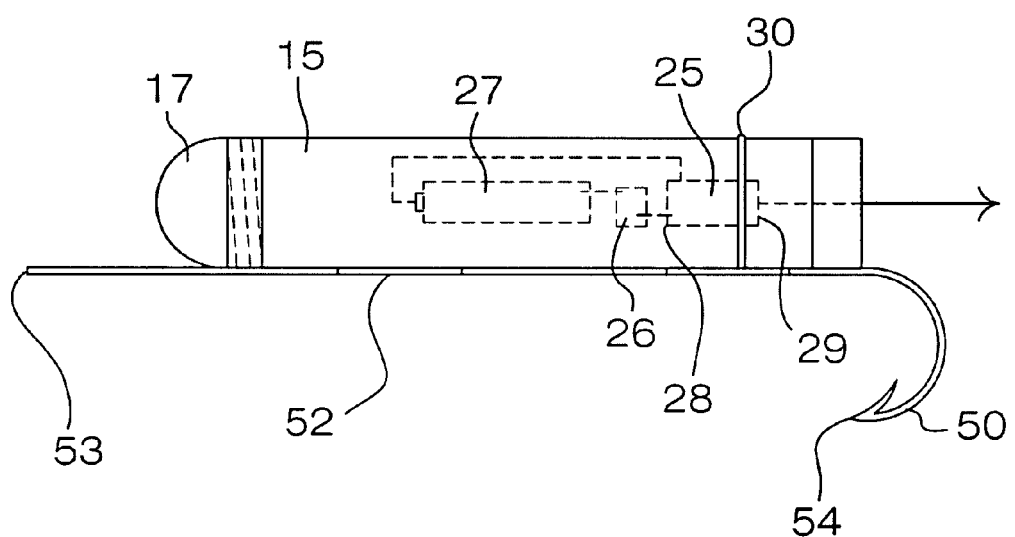
FIG. 3 illustrates the left side of the invention with the electrical components drawn in hidden lines.
Figure 4:
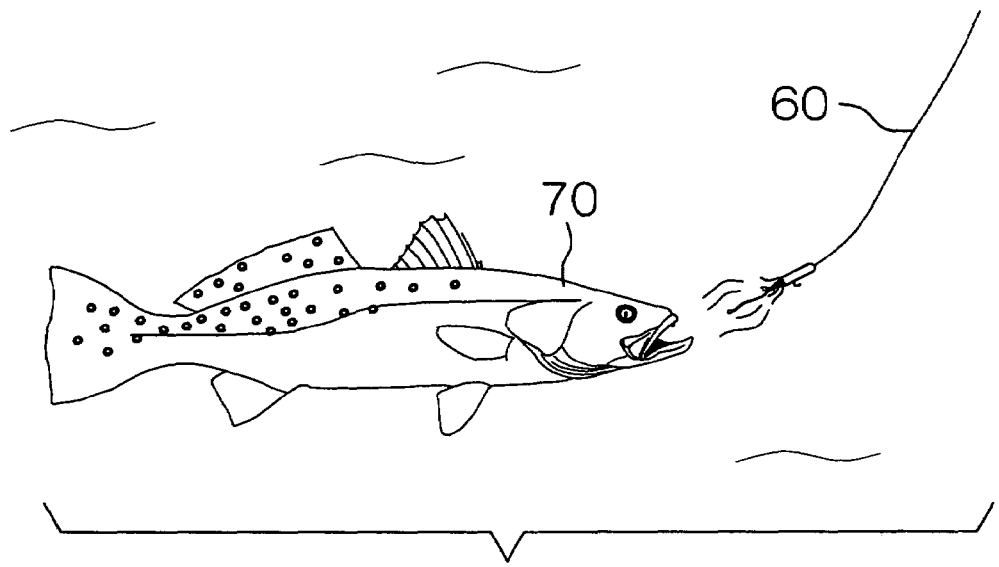
FIG. 4 illustrates the invention in use.
Figure 5:
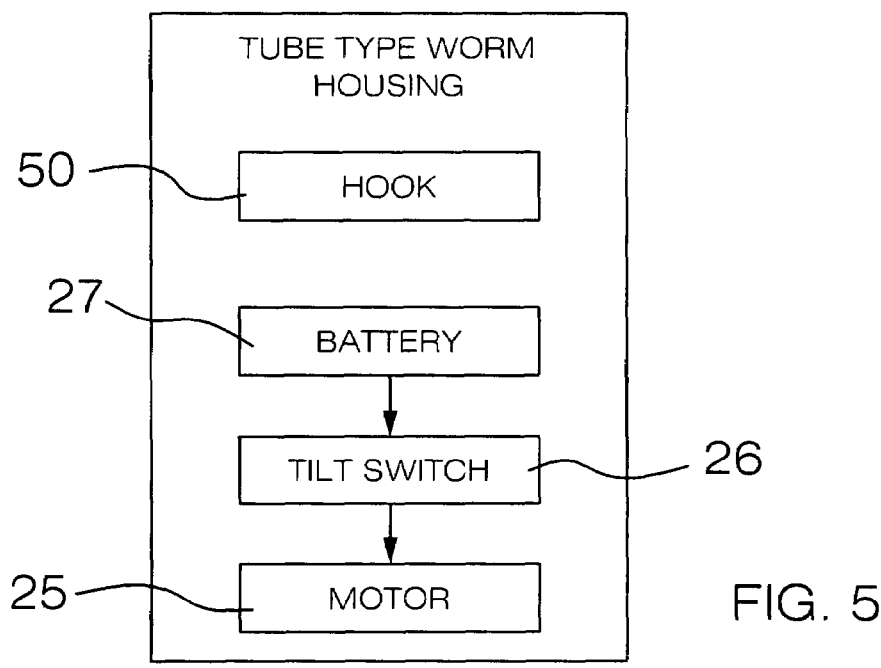
FIG. 5 diagrams all of the components attached to or contained within the housing of the invention.

Detailed reference will now be made to the preferred embodiment of the present invention, examples of which are illustrated in FIGS. 1-5. The invention comprises a housing 15, which has a top opening 16 wherein a cap 17 can be fastened to the top opening so as to seal the top end of the housing 15. The fastening means of the cap 17 to the housing 15 consists of an internal threading (not shown) contained at the top opening 16 of the housing 15, and an external threading contained 18 along the bottom edge of the cap 17.

Located within the housing 15 is a motor 25, which is permanently seated inside of the housing 15 at the opposite end from the top opening 16. The motor 25 has a first or top end 28 and a second or bottom end 29 which define a longitudinal axis therebetween. Electrically connected to the vibrator motor is a tilt switch 26, which is also electrically connected to a battery 27. The tilt switch 26, operates in such a way that when the housing 15 is at a predetermined range of angles, the invention will either turn on or off.

As previously discussed, the motor 25 is permanently seated inside of the housing 15, and has a watertight seal 30 located inside of the housing 15 such that water may not pass the seal 30 and enter the rest of the interior of the housing 15. The watertight seal 30 is also located between the first or top end 28 and second or bottom end 29 of the motor 25. At the bottom end 29 of the motor 25 is the output shaft (not shown), which connects to a tail 40. The housing 15 has a bottom opening 19 in order to accommodate the connection between the tail 40 and the output shaft (not shown) of the motor 25.

Located along the side of the housing 15 is a hook 50 which has a straight shaft 52 extending along a longitudinal axis thereof that is parallel to the longitudinal axis of the housing and also has a first end 53 defining an eye and a second end 54 defining a point. The hook 50 is securely fastened to the housing by a means comprising gluing, molding, or welding, and wherein the straight shaft 52 is in abutting relationship to an exterior surface of the housing 15 and the eye of the first end 53 extends beyond the cap in a direction parallel to the longitudinal axes of the housing 15 and the straight shank 52. The housing is made by a material comprising a durable plastic or a anti-oxidizing metal such as stainless steel or aluminum.

Once all of the components are installed inside of and connected to the housing 15, a fishing lure worm 51 is draped over and attached to the housing 15, as depicted in FIG. 1. The invention is then tied to a fishing line 60, and cast into a body of water full of hungry fish 70. As the angle of the housing reaches a predetermined angle, the tilt switch 26 will transfer electrical power from the battery 27 to the motor 25, which will in turn vibrate the tail 40, making the fishing lure appear live.

It shall be asserted that the tail 40 shall connect to the output shaft (not shown), which is connected to the motor 25 that can vibrate and/or rotate the tail 40. The ability of the tail 40 to vibrate and/or rotate is the core feature of the invention in that it yields an animated fishing lure that is perceived as a living organism from the perspective of the fish 70.

The inventor claims:

1. A fishing lure worm with vibrating tail comprising:
   (a) a housing both having first and second ends defining a longitudinal axis therebetween and defining an interior compartment therein;
      wherein the housing has a top opening containing an internal thread at the first end;
      wherein a bottom opening is located at the second end opposite from the top opening of the housing;
   (b) a cap;
      wherein the cap has an external threading that corresponds to the internal thread of the top opening of the housing;
      wherein the cap and housing screw on together via the internal threading and external threading so as to create a watertight seal;
   (c) a motor having first and second ends;
      wherein the motor is permanently seated inside of the housing, and next to the bottom opening;
      wherein a watertight seal is installed between the motor and the housing so as to prevent water from entering the housing beyond where the motor is located so as to define a watertight portion of the interior compartment of the housing, and the watertight seal being located between the first and second ends of the motor;
      wherein a shaft of the motor is so situated as to be located near the bottom opening of the housing and within a non-watertight portion of the interior compartment of the housing that is not protected by the watertight seal;
      wherein the shaft of the motor can vibrate and/or rotate;
   (d) a tilt switch;
      wherein the tilt switch is located inside of the watertight portion of the interior compartment of the housing;
      wherein the tilt switch is electrically wired to the motor;
      wherein the tilt switch is set at a predetermined angle to turn on and off electrical power to the motor;
   (e) a battery supply;
      wherein the battery supply is electrically wired to the tilt switch;
   (f) a hook having a straight shaft extending along a longitudinal axis thereof that is parallel to the longitudinal axis of the housing, the hook also having a first end defining an eye and a second end defining a point;
      wherein the hook is permanently affixed to an exterior side of the housing, the straight shaft being in abutting relationship with the exterior side of the housing, and the eye of the first end of the hook extending beyond the cap in a direction parallel to the longitudinal axes of the housing and the straight shank;
   (g) a fishing lure worm tail; and
      wherein the fishing lure worm tail is attached to the shaft of the motor, and is accessible via the bottom opening of the housing; and
   (h) a fishing worm lure;
      wherein the fishing lure worm lure is draped over and attached to the housing so as to provide the appearance of the body of a worm.

2. The fishing lure worm with vibrating tail as described in claim 1 wherein the housing and cap are made from a material comprising:
   (a) a durable plastic; or
   (b) a non-oxidizing metal.

* * * * *